Sept. 10, 1957  J. H. McVICKER  2,805,712
AUTOMOBILE WINDOW SCREEN
Filed May 22, 1953
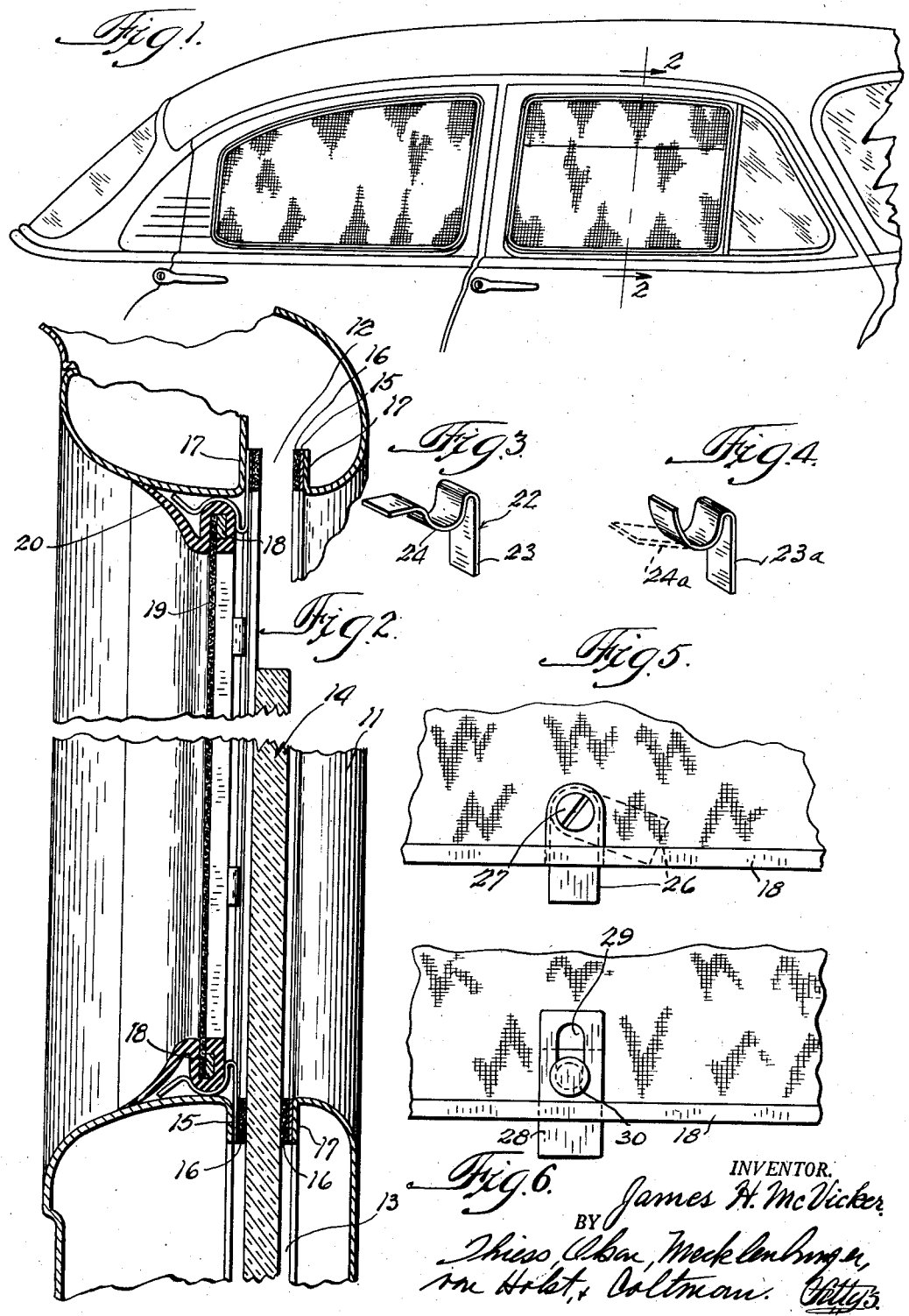
INVENTOR.
James H. McVicker

United States Patent Office 2,805,712
Patented Sept. 10, 1957

2,805,712
AUTOMOBILE WINDOW SCREEN

James H. McVicker, Chicago, Ill.

Application May 22, 1953, Serial No. 356,863

1 Claim. (Cl. 160—369)

The present invention relates to vehicle window screens and has special reference to removable window screens for use in automobiles.

More particularly this invention relates to screens for automobiles and other vehicles, and removable clips by means of which the screens may be easily and quickly mounted in the window frame or removed therefrom.

It is very desirable, particularly in summer, to employ screens in automobile windows to prevent the entry into the car of insects and foreign objects, such as stones or gravel which may be thrown by passing vehicles.

While attempts have heretofore been made to provide suitable window screens for automobiles, they have not proved satisfactory. The present screens, however, overcome the deficiencies of the prior screens. They may be easily and quickly positioned in a car window or removed therefrom. When located in the window they are positioned entirely inwardly of the windows so that there is no interference with the opening and closing of the glass windowpanes, and when the windowpane is closed the screen is on the inside where it is protected. The present screen is also held in place by removable clips which require no modification or alteration of the car in any way.

With the present screen construction, clips are placed in the channels of the window frame in which the periphery of the glass panes fit and which also serve as guides for the vertical sides of the panes. These clips are provided with a base portion so that they may be inserted between the silencing strips in the window channels and the adjacent portion of the door frame, and when in place cooperate to maintain the screen in proper position until it is desired to remove it. When the screens and retaining clips are removed, there are no screw holes, permanent attaching members on the window frames, or any other evidence of their having been employed.

An object of the present invention is to provide screens for the windows of automobiles and other vehicles.

Another object is to provide a vehicle window screen which may be easily and quickly inserted in a window frame or removed therefrom.

Still another object is to provide a screen construction which may be positioned in the window frames or removed from the same from within the car.

A further object is to provide a vehicle window screen that will not interfere with the normal operation of the window.

An additional object is to provide a screen and cooperating clips which serve to maintain the screen in position without any alteration or mutilation of the vehicle in any way.

Further objects and advantages will be apparent from the following description and claim when considered with the accompanying drawings, in which:

Fig. 1 is a partial perspective view of a sedan-type of automobile with window screens embodying the present invention positioned in the window frames;

Fig. 2 is a cross-sectional view taken on the line 2—2 of Fig. 1;

Fig. 3 is a preferred form of clip which may be employed for maintaining the screens in place;

Fig. 4 is a perspective view of another type of removable clip which may be employed in the present invention;

Fig. 5 is an elevational view of a portion of a screen with a securing clip pivotally mounted thereon; and Fig. 6 is a view similar to Fig. 5 showing a slidable clip mounted on the edge of the screen.

Referring more particularly to the drawings, there is shown an automobile of the closed type. The particular type illustrated is a 4-door sedan in which vertically movable windowpanes are provided in the rear doors and vertically movable windowpanes are also provided in the front door, except for the forward portions thereof which have the usual wing members pivotally mounted about a vertical axis.

While the present invention is described in connection with an automobile, it is to be understood that the invention is also applicable to trucks, buses and any other type of vehicle in which the windows are moved vertically in opening and closing.

As shown in Fig. 2 the window openings of automobile doors are defined by a frame 11 which is provided with slots or channels 12 about the periphery thereof. Below the bottom portion of the frame 11 there is a well 13 for receiving the windowpane 14 when it is in a lowered or partly lowered position. In Fig. 2 the window is shown partially closed.

In order to prevent rattling of the windowpane in the window frame, the opposed sides of the channels 12 are provided with silencing strips commonly consisting of a base formed of strip metal 15 to which is fixedly secured a layer of felt or other similar material. The metal strip 15 is secured to the adjacent portion of the frame 17 by welding or other suitable means at spaced intervals.

Each of the window screens preferably comprises a frame 18 of a size and shape to fit within its intended window frame with a mesh material preferably of the usual metallic screen type secured thereto by any suitable means. There is preferably positioned over the screened frame 18 a molding of rubber or other comparable material which is shaped to fit about the screen frame 18 with a peripheral flap 20 for engaging the adjacent portion of the window frame and acting to substantially seal the screen to the window frame at least sufficiently to prevent the entrance of substantially all objects between the screen and the window frame. The molding also prevents scratching or marring of the window frame.

When the screen is in position as shown in Fig. 2, the flap 20 extends inwardly toward the interior of the car and also beyond the periphery of the screen frame so that it will lie against the window frame.

The screen is preferably held in position by removable clips 22, which have a substantially flat base portion 23 and a substantially transversely extending screen engaging portion 24 which is rounded or otherwise shaped to receive the screen frame whether or not it has a rubber or other soft molding thereover. The clips are preferably made of resilient metal or other suitable material so that with the base 23 in place the transverse portion 24 will permit the screen to be snapped into place with the periphery thereof in the shaped portions 24 of the clips.

The clips are formed of thin strips permitting the base portion 23 to be inserted between the metal base portion 15 of the silencing strips and the adjacent portion of the window frame intermediate the points of attachment of the silencing strips to the frame.

To mount a screen in its window, clips are first placed about the frame with the flat base portions 23 inserted between the silencing strips and the frame. One or more of the clips is positioned at the top, bottom, front and rear sides of the window frame, at least two preferably being employed on each side. With the clips in place the screen is mounted by placing the upper frame portion in the rounded portions 24 of the clips at the top of the window frame and thereafter shoving the bottom inwardly causing the screen frame on the sides and bottom to engage the rest of the clips. To remove the screen it is only necessary to reverse the steps.

Another form of clip which may be employed in the present invention is illustrated in Fig. 4. It also provides a base portion 23a, and a substantially transversely extending portion 24a. The clip in this case is made of rather ductile material so that it may be easily bent. The clips with the transverse portion shaped as shown by the dotted line position in Fig. 4, are positioned in the window frame with the bases between the silencing strips and the frame. The screen frame is then inserted in place and thereafter the outer ends of the transverse clip portions are bent upwardly about the periphery of the screen substantially the shape shown in the full line position of Fig. 4.

It is also possible to employ clips such as the clip 26 shown in Fig. 5. In this construction the clip is pivotally mounted by screws or any other suitable member 27 adjacent the edge of the screen so that it may be moved to its dotted line position lying entirely within the periphery of the screen or to its full line position with a portion lying outwardly of the screen periphery.

In Fig. 6 a similar construction is shown except that the clip 28 is provided with a slot 29 for fitting over a rivet or other member 30, thus permitting the clip to be reciprocated from a position with a portion extending outwardly of the periphery of the screen to a position with the clip lying within the periphery of the screen.

To mount screens having permanently attached clips, as shown in Figs. 5 and 6, the clips are moved to their inner positions and the screen then mounted in the window frame. Thereafter, the clips are moved so that a portion thereof will lie between the silencing strips and the frame to thereby hold the window in place.

Although a resilient molding, such as the rubber molding 20 is employed, in the preferred form of construction this may be omitted, in which case there will be a slight space equal to the thickness of the clips 22 between the frame of the screen and the adjacent window frame in which it is mounted. However, this opening is so small that even without the rubber molding 20 a screen mounted in a window will prevent the entry of substantially all insects and foreign objects.

While particular embodiments of this invention have been illustrated and described, it will be understood, of course, that the invention is not to be limited thereto, since many modifications may be made, and it is contemplated therefore by the appended claim to cover any such modifications as fall within the true spirit and scope of this invention.

I claim:

A screen and clip construction for being removably positioned in a vehicle window frame formed with a channel for the glass window panel and having a silencing strip secured to said frame in said channel, said construction comprising a screen having a substantially rigid frame with substantially the same outer dimensions as the inner dimensions of said window frame and a mesh material secured in said frame, a strip of soft resilient material having a groove therein for fitting over the peripheral portion of said screen frame and having a flap extending inwardly toward the interior of said vehicle and beyond the periphery of said frame for engaging said window frame, and clips for removably securing a plurality of the sides of said screen frame in said window frame interiorly of said window, each of said clips being detachable with respect to said screen and window frame and having a substantially flat portion for being removably inserted between the window silencing strip and the window frame, and a generally transversely extending stiff resilient portion of a shape and size to fit about said soft resilient strip and hold said screen in said window frame when said clips are in operative position, said stiff resilient portion being largely concealed by said strip of soft resilient material when said screen is positioned in said window frame.

References Cited in the file of this patent

UNITED STATES PATENTS

| | | |
|---|---|---|
| 1,584,910 | Volker | May 8, 1926 |
| 1,955,648 | Nickler | Apr. 17, 1934 |
| 2,504,204 | Kiefer | Apr. 18, 1950 |
| 2,612,947 | Jenks | May 7, 1952 |
| 2,615,515 | Hoffman | Oct. 28, 1952 |